United States Patent
Nakayama et al.

(10) Patent No.: US 9,225,903 B2
(45) Date of Patent: Dec. 29, 2015

(54) IMAGE BLUR CORRECTION APPARATUS, METHOD OF CORRECTING IMAGE BLUR, AND IMAGING APPARATUS

(71) Applicant: Sony Corporation, Tokyo (JP)

(72) Inventors: Tatsuyuki Nakayama, Kanagawa (JP); Hideo Takagi, Saitama (JP); Kousuke Tsuchihashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/412,884

(22) PCT Filed: May 15, 2013

(86) PCT No.: PCT/JP2013/063519
§ 371 (c)(1),
(2) Date: Jan. 5, 2015

(87) PCT Pub. No.: WO2014/010303
PCT Pub. Date: Jan. 16, 2014

(65) Prior Publication Data
US 2015/0195458 A1   Jul. 9, 2015

(30) Foreign Application Priority Data
Jul. 12, 2012 (JP) .................................. 2012-156774

(51) Int. Cl.
*H04N 5/232* (2006.01)
*G03B 5/00* (2006.01)
(Continued)

(52) U.S. Cl.
CPC .......... *H04N 5/23287* (2013.01); *G02B 27/646* (2013.01); *G03B 5/00* (2013.01); *H04N 5/2254* (2013.01); *H04N 5/232* (2013.01); *H04N 5/2328* (2013.01); *H04N 5/23258* (2013.01); *G03B 2205/0023* (2013.01); *H04N 2101/00* (2013.01)

(58) Field of Classification Search
CPC . H04N 5/2254; H04N 5/232; H04N 5/23258; H04N 5/2328; G02B 27/646; G03B 5/00
See application file for complete search history.

(56) References Cited

U.S. PATENT DOCUMENTS 5,566,380 A * 10/1996 Honma ............................ 396/49
5,696,999 A * 12/1997 Matsushima et al. ........... 396/55
(Continued)

FOREIGN PATENT DOCUMENTS

JP  07-274056     10/1995
JP  07-274056 A  10/1995
(Continued)

OTHER PUBLICATIONS

International Search Report from International Publication PCT/JP2013/063519 mailed Aug. 20, 2013.

*Primary Examiner* — Nicholas Giles
(74) *Attorney, Agent, or Firm* — Hazuki International, LLC

(57) ABSTRACT

A lens unit 20 including an imaging optical system 31 and an imaging unit 33 to generate an image signal of an imaged image is supported rotatably in a yawing direction and in a pitching direction. Based on a shake which is applied to the lens unit 20 and is detected by a shake detection unit 61, a barycentric position of the lens unit 20 which position is calculated by a barycentric position calculation unit 62, and a position of the lens unit 20 which position is detected by a position detection unit 46, a driving operation by a drive unit 45 to perform rotation driving of the lens unit 20 in the yawing direction and in the pitching direction is controlled and image blur correction of the imaged image is performed. Even when the barycentric position of the lens unit varies due to a focus adjusting operation, a zooming operation, or the like, it becomes possible to perform optimal image blur correction and to improve performance in image blur correction.

8 Claims, 11 Drawing Sheets

(51) Int. Cl.
  *G02B 27/64* (2006.01)
  *H04N 5/225* (2006.01)
  *H04N 101/00* (2006.01)

(56) References Cited

U.S. PATENT DOCUMENTS

| | | | |
|---|---|---|---|
| 5,850,575 A * | 12/1998 | Ohishi | 396/52 |
| 6,362,852 B2 * | 3/2002 | Ito | 348/345 |
| 7,339,756 B2 * | 3/2008 | Tengeiji et al. | 359/811 |
| 7,519,283 B2 | 4/2009 | Mashima et al. | |
| 8,190,009 B2 | 5/2012 | Ibi | |
| 2001/0050718 A1 * | 12/2001 | Ito | 348/345 |
| 2006/0108964 A1 * | 5/2006 | Shibatani | 318/685 |
| 2007/0263300 A1 * | 11/2007 | Tengeiji et al. | 359/823 |

FOREIGN PATENT DOCUMENTS

| | | |
|---|---|---|
| JP | 11-142903 A | 5/1999 |
| JP | 2006-349953 A | 12/2006 |
| JP | 2011-137982 A | 7/2011 |
| JP | 2011-138166 A | 7/2011 |

* cited by examiner

IMAGE BLUR CORRECTION APPARATUS, METHOD OF CORRECTING IMAGE BLUR, AND IMAGING APPARATUS

CROSS-REFERENCE TO RELATED APPLICATION

The present application is a national phase entry under 35 U.S.C. §371 of International Application No. PCT/JP2013/063519 filed May 15, 2013, published on Jan. 16, 2014 as WO 2014/010303 A1, which claims priority from Japanese Patent Application No. JP 2012-156774 filed in the Japanese Patent Office on Jul. 12, 2012.

TECHNICAL FIELD

The present technique relates to an image blur correction apparatus, a method of correcting an image blur, and an imaging apparatus and makes it possible to improve performance in image blur correction.

BACKGROUND ART

There is an imaging apparatus such as a video camera or a still camera to which apparatus an image blur correction apparatus to correct an image blur of an imaged image which blur is caused by a camera shake or the like during imaging.

For example, in Patent Document 1, a lens unit including a lens and an imaging element is rotatable relative to outer chassis in a first direction which is an axial rotation direction of a first fulcrum shaft orthogonal to an optical axis of the lens. Furthermore, the lens unit is rotatable in a second direction which is an axial rotation direction of a second fulcrum shaft orthogonal to the optical axis and the first fulcrum shaft. The lens unit is rotated in a yawing direction with the first fulcrum shaft as a fulcrum point and is rotated in a pitching direction with the second fulcrum shaft as a fulcrum point, and thus, correction of an image blur is performed. Also, in Patent Document 1, two drive motors (flat motor) each of which includes a plurality of coil parts, a magnet, and a yoke are used as drive units to rotate the lens unit in the yawing direction and in the pitching direction.

CITATION LIST

Patent Document

Patent Document 1: Japanese Patent Application Laid-Open No. 7-274056

SUMMARY OF THE INVENTION

Problems to be Solved by the Invention

Incidentally, when a focus adjusting operation or a zooming operation is performed, a focus lens or a zoom lens provided in a lens unit is moved and a barycentric position of the lens unit changes. Thus, in a case where image blur correction is performed by rotating the lens unit according to a shake applied to the lens unit, it may not be possible to perform optimal image blur correction due to the change of the barycentric position of the lens unit. For example, when the barycentric position of the lens unit becomes away from a position of the above-described fulcrum shaft, driving force necessary for rotating the lens unit becomes larger. Thus, it becomes difficult to rotate the lens unit according to the shake applied to the lens unit and to perform the optimal image blur correction.

Thus, in the present technique, an image blur correction apparatus, a method of correcting an image blur, and an imaging apparatus which make it possible to improve performance in image blur correction is provided.

Solutions to Problems

A first aspect of the present technique is an image blur correction apparatus including: a lens unit which includes an imaging optical system and an imaging unit configured to generate an image signal of an imaged image and which is supported rotatably in a yawing direction and in a pitching direction; a shake detection unit configured to detect a shake applied to the lens unit; a position detection unit configured to detect a position of the lens unit; a drive unit configured to perform rotation driving of the lens unit in a yawing direction and in a pitching direction; and a blur correction control unit configured to correct an image blur of the imaged image by controlling the driving operation, which is performed by the drive unit, based on the shake detected by the shake detection unit, the position detected by the position detection unit, and a barycentric position of the lens unit.

In the technique, the lens unit including the imaging optical system and the imaging unit configured to generate an image signal of an imaged image is supported, for example, by a gimbal mechanism rotatably in the yawing direction and in the pitching direction and is driven and rotated in the yawing direction and in the pitching direction by the drive unit. By the shake detection unit, a shake applied to the lens unit is detected. By a barycentric position calculation unit, a barycentric position of the lens unit is calculated. By the position detection unit, a current position of the lens unit is detected. By an image blur correction control unit, based on the shake detected by the shake detection unit, the position of the lens unit which position is detected by the position detection unit, and the barycentric position of the lens unit, a driving operation by the drive unit is controlled and correction of an image blur of the imaged image is performed. For example, according to a deviation between a target position of the lens unit, which position is calculated based on the shake detected by the shake detection unit, and a current position of the lens unit which position is detected by the position detection unit and according to the barycentric position of the lens unit which position is calculated by the barycentric position calculation unit, the image blur correction control unit performs a combination of proportional control, differential control, and integral control and controls a rotation driving operation of the lens unit in such a manner that the position of the lens unit becomes identical to the target position. Also, in the integral control, a correction value is set in such a manner to cancel a load which changes according to the barycentric position of the lens unit and the integral control is performed by using the correction value. Also, mounting of an accessory to the lens unit is detected and the rotation driving operation of the lens unit in the yawing direction and in the pitching direction is controlled by using a result of the detection.

A second aspect of the present technique is a method of correcting an image blur, including: detecting a shake applied to a lens unit which includes an imaging optical system and an imaging unit configured to generate an image signal of an imaged image and which is supported rotatably in a yawing direction and in a pitching direction; detecting a position of the lens unit; performing rotation driving of the lens unit in the yawing direction and in the pitching direction; and correcting an image blur of the imaged image by controlling a rotation driving operation of the lens unit based on the detected shake, the detected position, and a barycentric position of the lens unit.

A third aspect of the present technique is an imaging apparatus including: a lens unit which includes an imaging optical system and an imaging unit configured to generate an image signal of an imaged image and which is supported rotatably in a yawing direction and in a pitching direction; a shake detection unit configured to detect a shake applied to the lens unit; a position detection unit configured to detect a position of the lens unit; a drive unit configured to perform rotation driving of the lens unit in the yawing direction and in the pitching direction; a blur correction control unit configured to correct an image blur of the imaged image by controlling the driving operation, which is performed by the drive unit, based on the shake detected by the shake detection unit, the position detected by the position detection unit, and a barycentric position of the lens unit; and a control unit configured to control an operation of the blur correction control unit.

Effects of the Invention

According to the technique, a lens unit including an imaging optical system and an imaging unit configured to generate an image signal of an imaged image is supported rotatably in a yawing direction and in a pitching direction. Based on a shake applied to the lens unit, a position of the lens unit, and a barycentric position of the lens unit, a driving operation by a drive unit to perform rotation driving of the lens unit in the yawing direction and in the pitching direction is controlled and correction of an image blur of the imaged image is performed. Thus, even when a barycentric position of the lens unit varies due to a focus adjusting operation, a zooming operation, or the like, it becomes possible to perform optimal image blur correction and to improve performance in image blur correction.

MODE FOR CARRYING OUT THE INVENTION

In the following, a mode for carrying out the present technique will be described. Note that the description will be made in the following order.

1. Configuration of image blur correction apparatus
2. First embodiment
2-1. Configuration of first embodiment
2-2. Operation of first embodiment
3. Second embodiment
3-1. Configuration and operation of second embodiment <1. Configuration of Image Blur Correction Apparatus>

The image blur correction apparatus includes a lens unit, a shake detection unit, a barycentric position calculation unit, a position detection unit, a drive unit, and a blur correction control unit. The lens unit includes an imaging optical system and an imaging unit to generate an image signal of an imaged image and is supported rotatably in a yawing direction and in a pitching direction. The shake detection unit detects a shake applied to the lens unit. The barycentric position calculation unit calculates a barycentric position of the lens unit. The position detection unit detects a position of the lens unit. The drive unit performs rotation driving of the lens unit in the yawing direction and in the pitching direction. Also, based on the shake detected by the shake detection unit, the position of the lens unit which position is detected by the position detection unit, and the barycentric position of the lens unit, the blur correction control unit controls driving operation which is performed by the drive unit and corrects an image blur of the imaged image.

Figure 1:
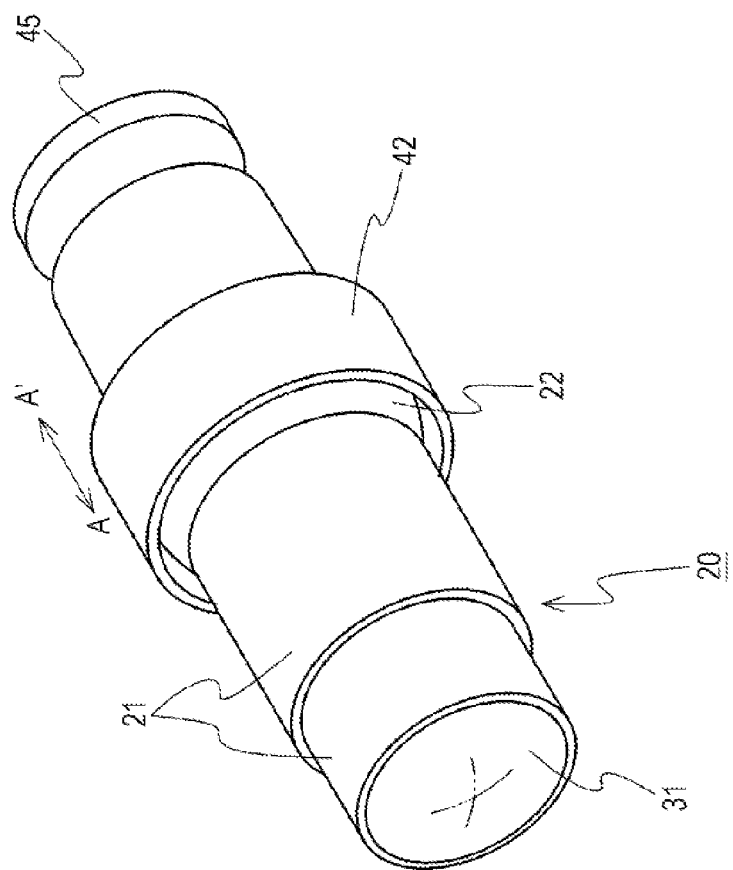
FIG. 1 is a perspective view illustrating an outer appearance of an image blur correction apparatus.

FIG. 1 is a perspective view illustrating an outer appearance of the image blur correction apparatus. In the image blur correction apparatus, a lens unit 20 is held by an unit holding part 42 rotatably in a yawing direction and in a pitching direction. Also, the image blur correction apparatus rotates the lens unit 20 in the yawing direction and in the pitching direction based on a drive signal from the blur correction control unit and corrects an image blur of an imaged image which blur is caused due to a shake applied to the lens unit 20. Also, a mirror tube 21 of the lens unit 20 is extended and contracted in an optical axis direction of the imaging lens according, for example, to a change of a zoom ratio.

Figure 2:
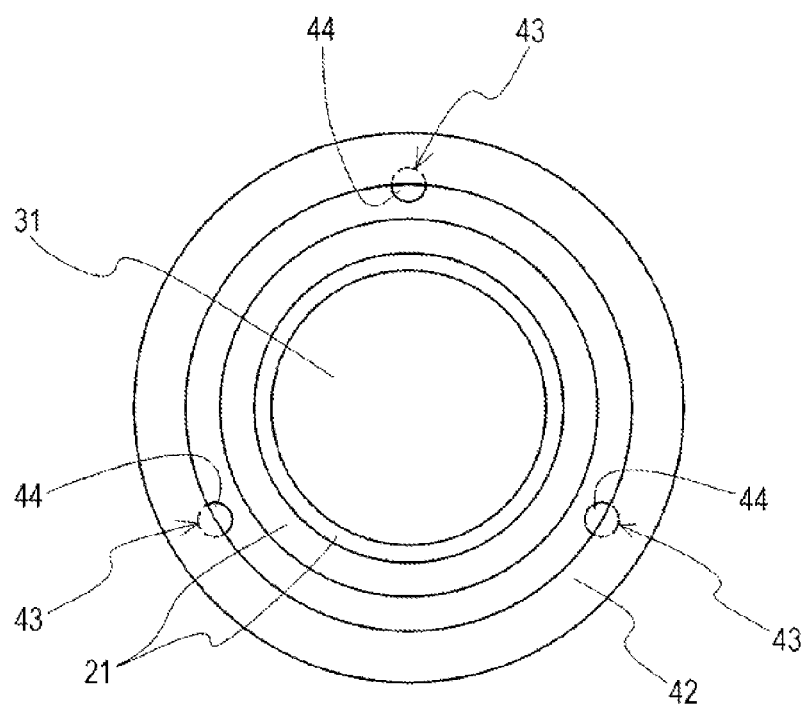
FIG. 2 is a front view of a lens unit held by a unit holding part.
Figure 3:
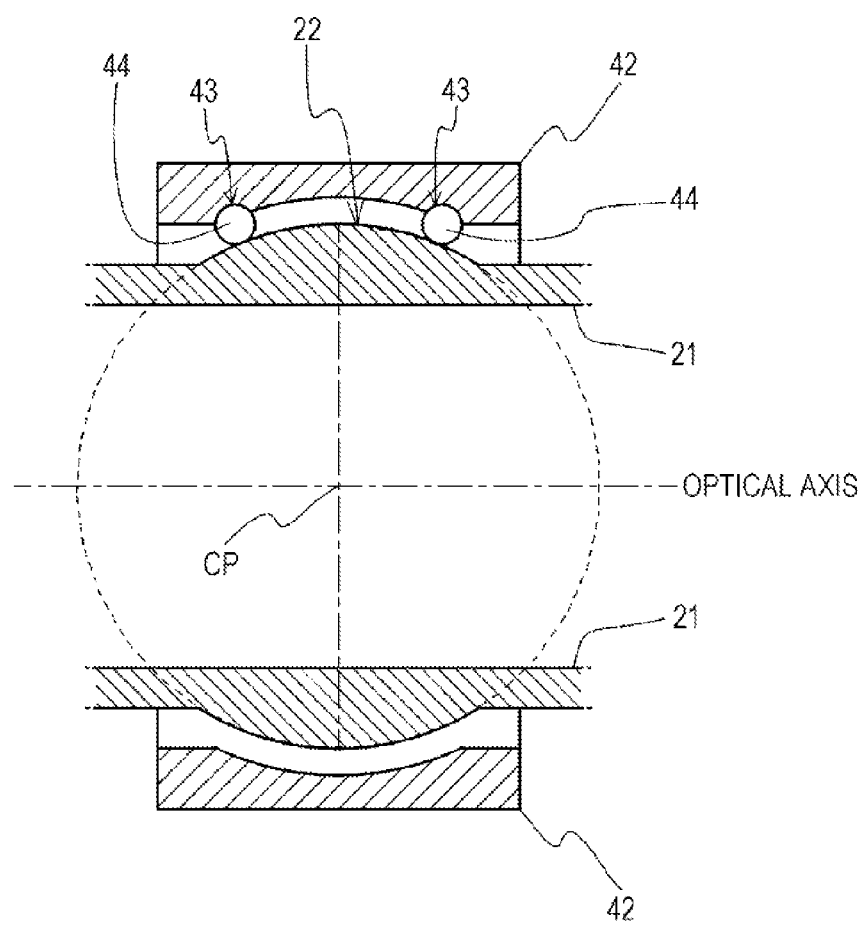
FIG. 3 is a sectional schematic view of the unit holding part.

FIG. 2 is a front view of the lens unit held by the unit holding part and FIG. 3 is a sectional schematic view of the unit holding part. Note that FIG. 3 illustrates a sectional surface in the optical axis direction of the lens unit (sectional view at position illustrated in A-A' line in FIG. 1).

On the mirror tube 21 of the lens unit 20, a protruded surface which is a part of a spherical surface with a predetermined position on the optical axis of the imaging lens as a center position CP is formed as a rolling surface 22 in a zonal manner in a circumferential direction of a surface of the mirror tube 21. In the unit holding part 42, on a surface which faces the rolling surface 22 formed on the mirror tube 21, a ball holding part 43 is formed and a ball 44 is held by the ball holding part 43 in such a manner that the ball 44 can roll on the rolling surface 22. A plurality of ball holding parts 43 is formed in such a manner to sandwich a top part of the rolling surface 22. For example, in FIG. 3, two ball holding parts 43 are formed in such a manner to sandwich the top part of the rolling surface 22. Furthermore, the plurality of ball holding parts 43 is provided to the unit holding part 42 in a circumferential direction of the mirror tube 21 in such a manner that a position of the mirror tube 21 does not move in a radial direction. For example, as illustrated in FIG. 2, the ball holding parts 43 are provided in such a manner that a distance therebetween becomes 120°.

Thus, while being held by the unit holding part 42, the lens unit 20 becomes rotatable in the yawing direction and in the pitching direction with the center position CP of the rolling surface 22 as reference. Note that the unit holding part 42 is formed, for example, in a chassis 41 which will be described later.

Figure 4:
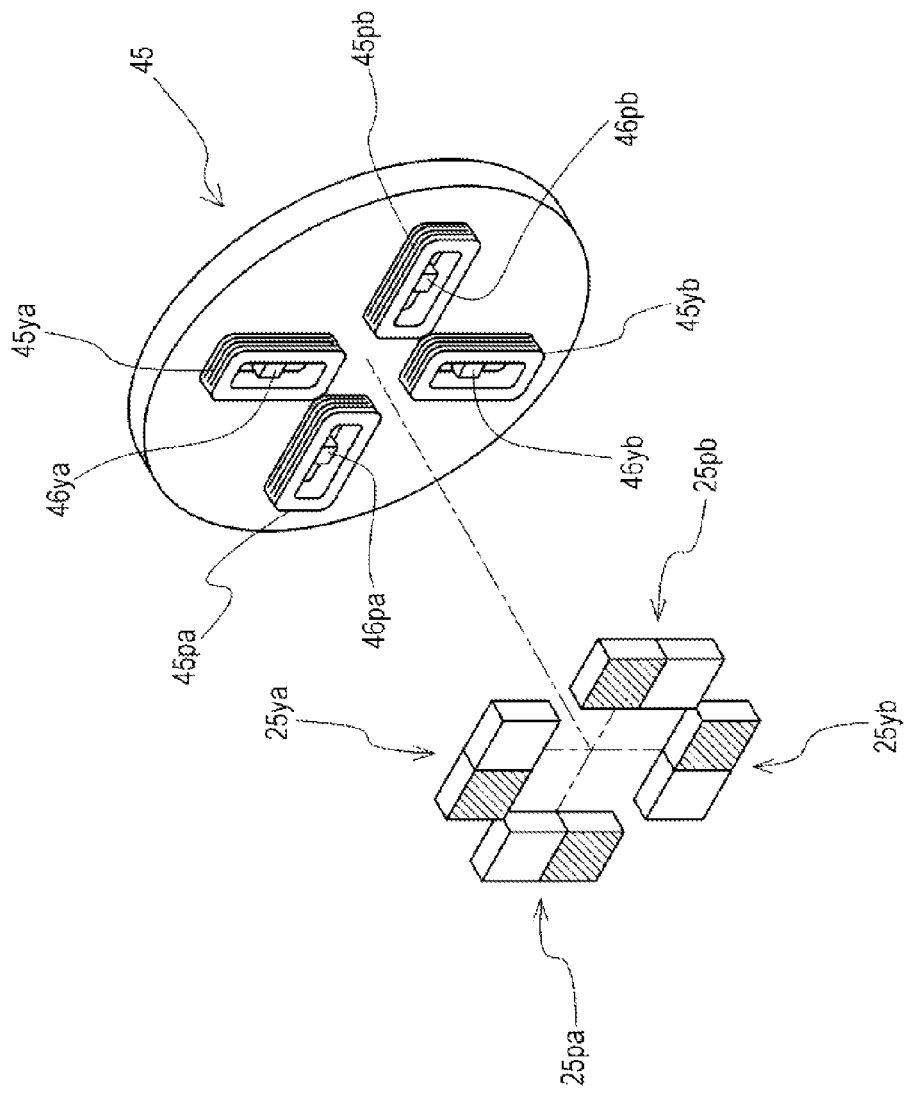
FIG. 4 is a perspective view illustrating a configuration of a drive unit.

FIG. 4 is a perspective view illustrating a configuration of the drive unit to perform rotation driving of the lens unit in the yawing direction and in the pitching direction. The drive unit 45 is provided to a surface of a chassis which faces a rear end surface of the lens unit 20. The drive unit 45 includes drive coils 45*ya* and 45*yb* to rotate the lens unit 20 in the yawing direction and drive coils 45*pa* and 45*pb* to rotate the lens unit 20 in the pitching direction. Also, a magnet 25*ya* is provided to a position, which corresponds to that of the drive coil 45*ya*, on the rear end surface of the lens unit 20. Similarly, to positions respectively corresponding to those of the drive coils 45*yb*, 45*pa*, and 45*pb*, magnets 25*yb*, 25*pa*, and 25*pb* are respectively provided.

In the magnet 25*ya*, a magnet in which a magnetic pole of a surface facing the drive coil 45*ya* is a South pole and a magnet in which a magnetic pole of a surface facing the drive coil 45*ya* is a North pole are lined up in a horizontal direction. Note that in FIG. 4, the magnet in which a magnetic pole of the surface facing the drive coil is the South pole is highlighted. In the magnet 25*yb*, a magnet in which a magnetic pole of a surface facing the drive coil 45*yb* is the South pole and a magnet in which a magnetic pole of a surface facing the drive coil 45*yb* is the North pole are lined up in the horizontal direction.

In the magnet 25*pa*, a magnet in which a magnetic pole of a surface facing the drive coil 45*pa* is the South pole and a magnet in which a magnetic pole of a surface facing the drive coil 45*pa* is the North pole are lined up in a vertical direction. In the magnet 25*pb*, a magnet in which a magnetic pole of a surface facing the drive coil 45*pb* is the South pole and a magnet in which a surface facing the drive coil 45*pb* is the North pole are lined up in the vertical direction.

With the lens unit 20 as a center position (center position of rotation range), the magnet 25*ya* (25*yb*) and the drive coil 45*ya* (45*yb*) are arranged in such a manner that a center position between two magnets lined up in the horizontal direction in the magnet 25*ya* (25*yb*) becomes a center position of the drive coil 45*ya* (45*yb*). Similarly, with the lens unit 20 as the center position, the magnet 25*pa* (25*pb*) and the drive coil 45*pa* (45*pb*) are arranged in such a manner that a center position between two magnets lined up in the vertical direction in the magnet 25*pa* (25*pb*) becomes a center position of the drive coil 45*pa* (45*pb*).

Moreover, to an inner side of each of the drive coils 45*ya* (45*yb*) and 45*pa* (45*pb*), a position detection unit 46 to determine a rotation position of the lens unit 20 by detecting a magnetic field generated by each of the magnets 25*ya* (25*yb*) and 25*pa* (25*pb*) is provided. For example, the position detection units 46 are configured by respectively using hall elements 46*ya* (46*yb*) and 46*pa* (46*pb*).

Figure 5:
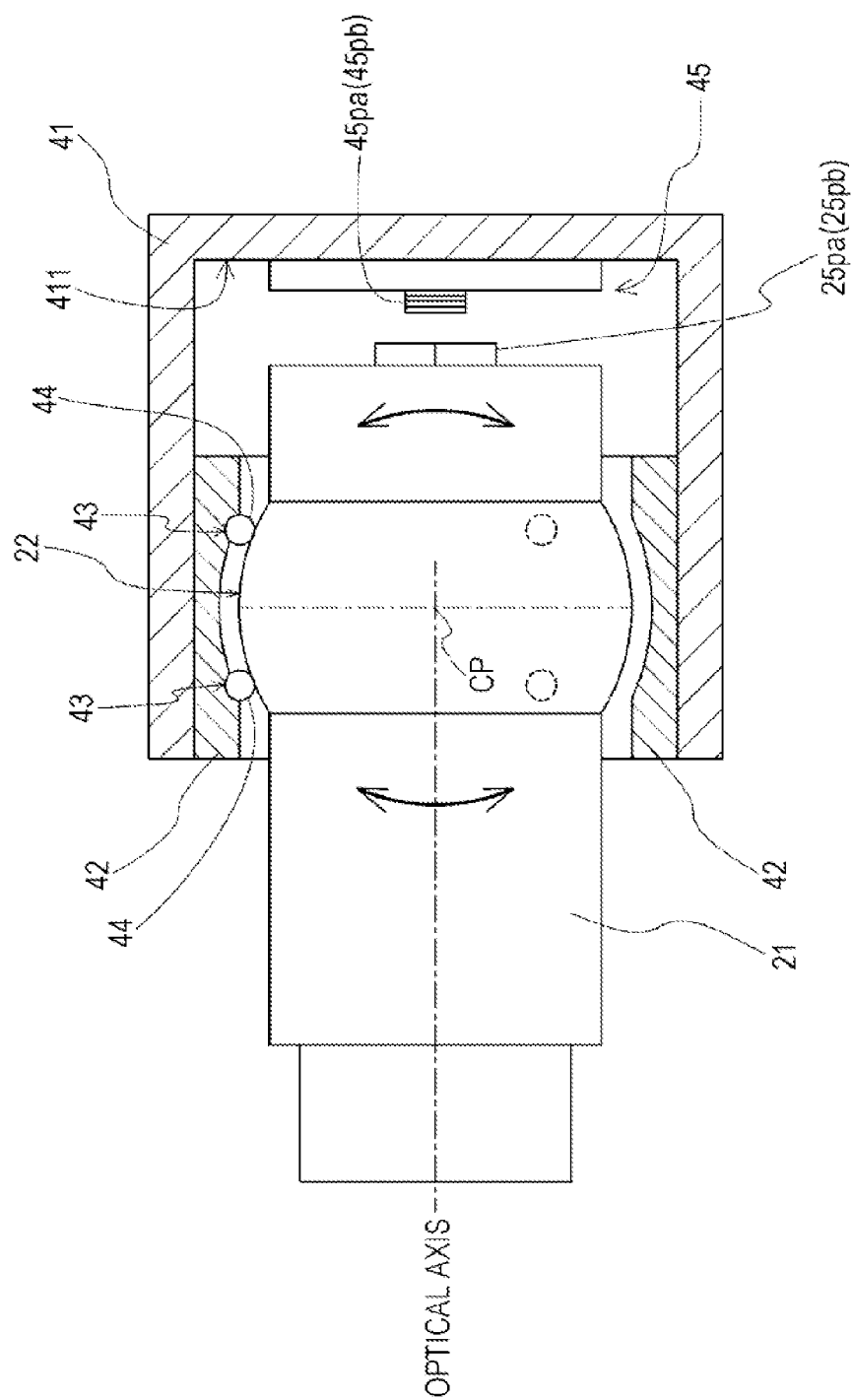
FIG. 5 is a view for describing an operation of the drive unit.

FIG. 5 is a view for describing an operation of the drive unit. Note that in FIG. 5, an example of a rotation operation in the pitching direction is illustrated. Also, the drive unit 45 is provided to a surface of a chassis 411 which surface faces a rear end surface of the lens unit 20.

As described above, since the ball 44 is provided between the rolling surface 22 and the ball holding part 43 of the unit holding part 42, the lens unit 20 is held rotatably with the center position CP of the rolling surface 22 as a fulcrum point of rotation.

Also, with the lens unit 20 as the center position (center position of rotatable range), arrangement is performed in such a manner that a center position between two magnets lined up in the vertical direction in the magnet 25*pa* (25*pb*) becomes a center position of the drive coil 45*pa* (45*pb*). Here, when current is supplied to the drive coil 45*pa* (45*pb*), a magnetic field is generated according to the supplied current and the magnet 25*pa* (25*pb*) is moved in the vertical direction by the generated magnetic field. That is, by supplying current to the drive coil 45*pa* (45*pb*) and rotating the lens unit 20 according to a shake in the pitching direction applied to the lens unit 20, an image blur in the pitching direction can be corrected. Although not illustrated, by supplying current to the drive coil 45*ya* (45*yb*) and rotating the lens unit 20 according to a shake in the yawing direction applied to the lens unit 20, an image blur in the yawing direction can be corrected.

In such a manner, by rotating the lens unit 20 by the drive unit 45 according to a shake applied to the lens unit 20, an image blur can be corrected.

Note that a configuration to rotate the lens unit 20 in the yawing direction and in the pitching direction is not limited to the configuration illustrated in FIG. 1 to FIG. 5. For example, a first rotary shaft is provided in the vertical direction (horizontal direction) of the lens unit and the first rotary shaft is held rotatably by an inner frame. Also, the first rotary shaft is rotated in the yawing direction (pitching direction) by a motor or the like. Moreover, a second rotary shaft is provided in the horizontal direction (vertical direction) of the inner frame and the second rotary shaft is held rotatably by an outer frame. Also, the second rotary shaft is rotated in the pitching direction (yawing direction) by a motor or the like. As described, the lens unit 20 may be supported rotatably by the first rotary shaft and the second rotary shaft and each of the first rotary shaft and the second rotary shaft may be rotated by a motor or the like.

<2. First Embodiment>

[2-1. Configuration of First Embodiment]

Figure 6:
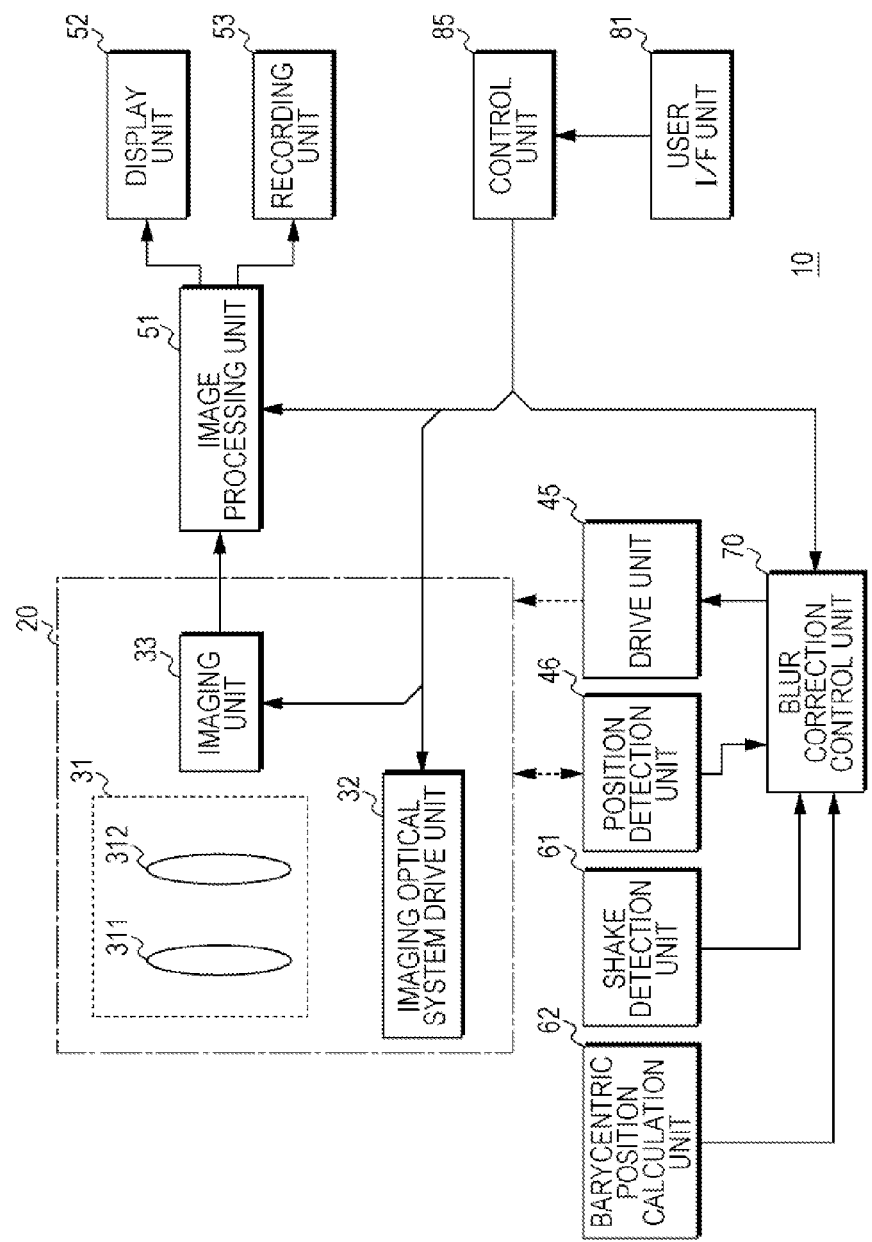
FIG. 6 is a view illustrating an example of a configuration of a first embodiment.

FIG. 6 is a view illustrating an example of a configuration of the first embodiment. An imaging apparatus 10 using the image blur correction apparatus includes the lens unit 20, the drive unit 45, the position detection unit 46, an image processing unit 51, a display unit 52, a recording unit 53, a shake detection unit 61, a barycentric position calculation unit 62, a blur correction control unit 70, an user interface unit 81, and a control unit 85.

To the lens unit 20, an imaging optical system 31, an imaging optical system drive unit 32, and an imaging unit 33 are provided.

The imaging optical system 31 includes a focus lens 311, a zoom lens 312, or the like. In the imaging optical system 31, for example, the focus lens 311 is moved in an optical axis direction and a focus adjustment is performed. Also, the zoom lens 312 is moved in the optical axis direction and a focal length is varied.

The imaging optical system drive unit 32 drives the focus lens 311 or the zoom lens 312 based on a control signal from the control unit 85 which will be described later.

The imaging unit 33 includes an imaging element, a preprocessing unit, an imaging drive unit, and the like. The imaging element performs photoelectric conversion processing and converts an optical image, which is formed on an imaging surface by the imaging optical system 31, into an electric signal. As the imaging element, for example, a charge coupled device (CCD) image sensor or a complementary metal-oxide semiconductor (CMOS) image sensor is used. The preprocessing unit performs noise elimination processing such as correlated double sampling (CDS) on the electric signal generated in the imaging element. Also, the preprocessing unit performs a gain adjustment to make a signal level of the electric signal into an intended signal level. Furthermore, the preprocessing unit performs A/D conversion processing and converts an analog image signal, which is the electric signal on which the noise elimination processing or the gain adjustment is performed, into a digital image signal. Then, the preprocessing unit outputs the digital image signal to an image processing unit 51. The imaging drive unit generates an operation pulse or the like necessary for driving the imaging element based on a control signal from the control unit 85 which will be described later. For example, an electric charge reading pulse to read electric charge, a transfer pulse to perform transfer in the vertical direction or the horizontal direction, and a shutter pulse to perform an electronic shutter operation are generated.

As described above, the drive unit 45 rotates the lens unit 20 in the yawing direction and in the pitching direction based on a drive signal supplied from the blur correction control unit 70. Also, the position detection unit 46 generates a detection signal corresponding to a position of the lens unit 20 and outputs the detection signal to the blur correction control unit 70. For example, detection signals respectively generated in the hall elements 46ya (46yb) and 46pa (46pb) are output to the blur correction control unit 70.

The image processing unit 51 performs camera process processing or the like on the digital image signal output from the imaging unit 33. For example, on the image signal, the image processing unit 51 performs nonlinear processing, color correction processing, contour emphasizing processing, or the like such as gamma correction or knee correction. The image processing unit 51 outputs the processed image signal to the display unit 52 or the recording unit 53.

The display unit 52 configures a display panel or an electronic viewfinder and performs, for example, display of a live view image based on the image signal output from the image processing unit 51. Also, the display unit 52 performs menu display, operation state display, or the like to perform operation setting of the imaging apparatus 10. Note that when the number of display pixels is less than the number of pixels of the imaged image, the display unit 52 performs processing to convert the imaged image into a display image of the number of display images.

The recording unit 53 records the image signal output from the image processing unit 51 into a recording medium. The recording medium may be a removable medium such as a memory card, an optical disk, or a magnetic tape or may be a fixed-type hard disk drive (HDD), semiconductor memory module, or the like. Also, an encoder or a decoder may be provided to the recording unit 53 and compression coding or extension decoding of the image signal may be performed. To the recording medium, a coded signal may be recorded. Note that in the recording unit 53, an image signal or a coded signal recorded in the recording medium may be read and a recorded image may be displayed on the display unit 52.

The shake detection unit 61 includes a sensor to detect a shake applied to the imaging apparatus 10 (lens unit 20) such as an acceleration sensor or a gyro sensor. The shake detection unit 61 detects a shake applied to the imaging apparatus 10 (lens unit 20) and outputs a result of the detection to the blur correction control unit 70.

The barycentric position calculation unit 62 calculates a barycentric position of the lens unit 20 which position changes according to a position of the focus lens 311 or the zoom lens 312 of the imaging optical system 31 and an extension state of the mirror tube 21. For example, a barycentric position is previously calculated for each position of the focus lens 311 or the zoom lens 312 and each extension state of the mirror tube 21 and is tabulated and stored into the barycentric position calculation unit 62. The barycentric position calculation unit 62 calculates the barycentric position of the lens unit 20 by acquiring, from the lens unit 20, information indicating a position of the focus lens 311 or the zoom lens 312 and an extension state of the mirror tube 21 and by selecting, from the table, a barycentric position corresponding to the acquired information. Also, based on a position of the focus lens 311 or the zoom lens 312 of the imaging optical system 31 and an extension state of the mirror tube 21, the barycentric position calculation unit 62 may calculate a barycentric position of the lens unit 20 by performing calculation at each time. Furthermore, the barycentric position calculation unit 62 may calculate a barycentric position of the lens unit 20 by using a control signal supplied from the control unit 85 to the imaging optical system drive unit 32. For example, the barycentric position calculation unit 62 determines a position of the focus lens 311 or the zoom lens 312 and an extension state of the mirror tube 21 based on the control signal supplied to the imaging optical system drive unit 32 and calculates a barycentric position of the lens unit 20 based on a result of the determination. The barycentric position calculation unit 62 outputs the barycentric position of the lens unit 20 to the blur correction control unit 70.

The blur correction control unit 70 generates a drive signal based on the shake detected by the shake detection unit 61 and the position of the lens unit 20 detected by the position detection unit 46. The blur correction control unit 70 supplies the generated drive signal to the drive unit 45 and makes it possible to generate an image signal of an imaged image, an image blur of which is corrected, in the imaging unit 33. Also, the blur correction control unit 70 controls generation of a drive signal based on the barycentric position calculated by the barycentric position calculation unit 62 and makes it possible to constantly generate the image signal of the imaged image, an image blur of which is corrected, in the imaging unit 33 even when the barycentric position of the lens unit 20 varies.

The user interface (user I/F) unit 81 includes a zoom lever, a shooting button, and the like. The user I/F unit 81 generates an operation signal corresponding to user operation and outputs the operation signal to the control unit 85.

The control unit 85 includes, for example, a central processing unit (CPU), a read only memory (ROM), and a random access memory (RAM). The CPU reads and executes a program housed in the ROM when necessary. In the ROM, the program executed in the CPU, data which becomes necessary in various kinds of processing, and the like are stored in advance. The RAM is a memory which is used as a so-called work area which temporarily stores a halfway result of processing. Also, the ROM or the RAM stores various kinds of control information, correction data, and the like. The control unit 85 performs control of each unit according to an operation signal or the like from the user I/F unit 81 and makes the imaging apparatus 10 perform an operation corresponding to user operation. Also, the control unit 85 controls the blur correction control unit 70 and makes the blur correction control unit 70 perform an image blur correction operation.

Figure 7:
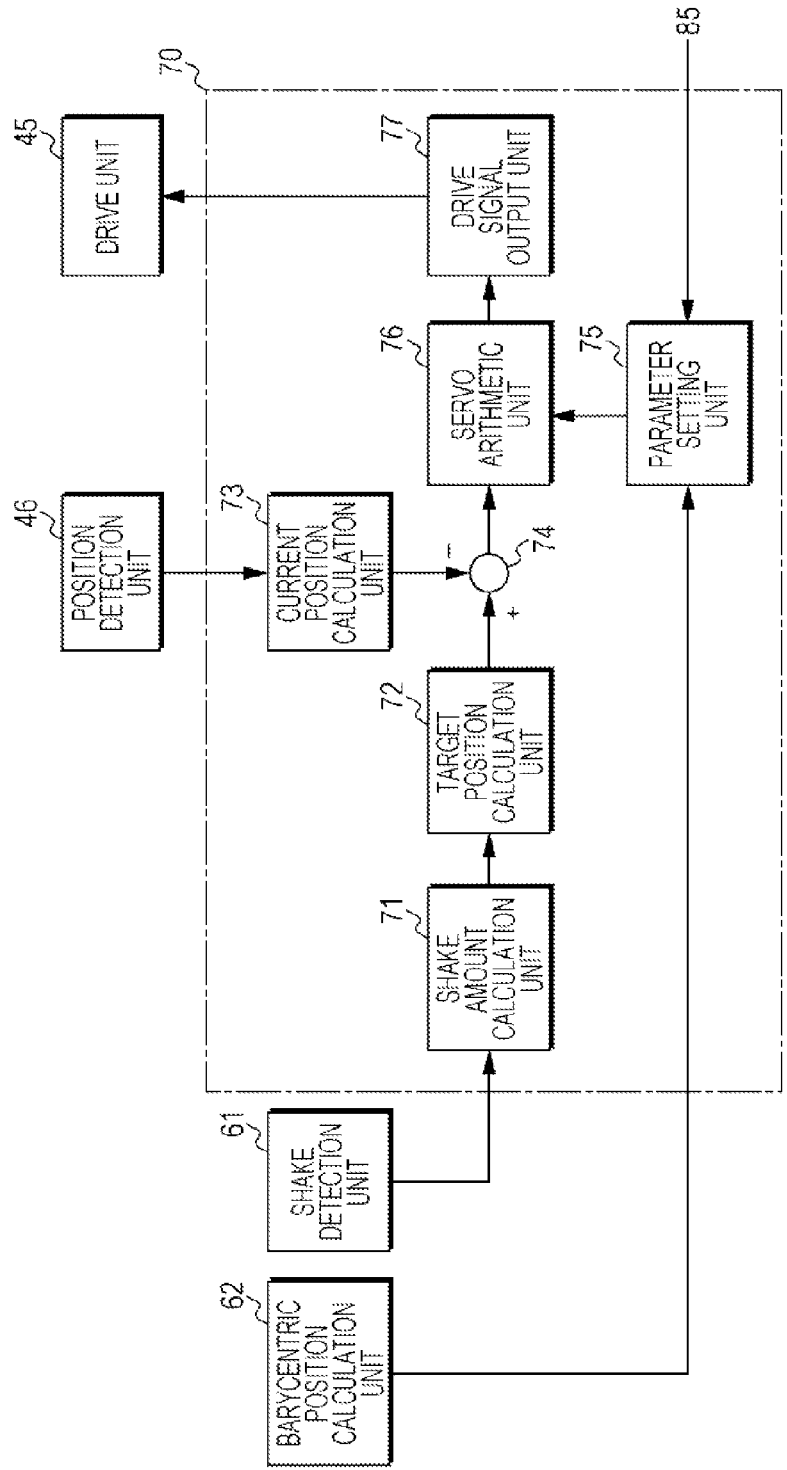
FIG. 7 is a view illustrating an example of a configuration of a blur correction control unit.

FIG. 7 is a view illustrating an example of a configuration of the blur correction control unit. The blur correction control unit 70 includes a shake amount calculation unit 71, a target position calculation unit 72, a current position calculation unit 73, an arithmetic unit 74, a parameter setting unit 75, a servo arithmetic unit 76, and a drive signal output unit 77.

The shake amount calculation unit 71 calculates a shake amount of the shake applied to the imaging apparatus 10 (lens unit 20) based on a detection signal supplied from the shake detection unit 61. The shake amount calculation unit 71 outputs the calculated shake amount to the target position calculation unit 72.

Based on the shake amount calculated by the shake amount calculation unit 71, the target position calculation unit 72 calculates a position of the lens unit 20 at which position an image signal of an imaged image, in which an image blur is not caused, can be generated in the imaging unit 33. Then, the target position calculation unit 72 outputs the calculated position as a target position to the arithmetic unit 74.

The current position calculation unit 73 calculates a current position of the lens unit 20 based on a detection signal from the position detection unit 46 such as detection signals respectively generated in the hall elements 46ya (46yb) and 46pa (46pb). The current position calculation unit 73 outputs the calculated current position from the arithmetic unit 74 to the arithmetic unit 74.

The arithmetic unit 74 calculates an error between the target position and the current position and outputs a positional error signal indicating the calculated error amount to the servo arithmetic unit 76.

Based on a control signal from the control unit 85, the parameter setting unit 75 performs setting of a parameter used in the servo arithmetic unit 76. Also, based on the barycentric position calculated by the barycentric position calculation unit 62, the parameter setting unit 75 changes the parameter in such a manner that an image signal of an imaged image, an image blur of which is corrected, can be constantly generated in the imaging unit 33 even when the barycentric position of the lens unit 20 varies.

The servo arithmetic unit 76 performs a servo operation by using the parameter set by the parameter setting unit 75 and generates a control signal in such a manner that the error amount calculated by the arithmetic unit 74 becomes "0". Then, the servo arithmetic unit 76 outputs the control signal to the drive signal output unit 77.

By generating a drive signal based on the control signal supplied from the servo arithmetic unit 76 and by supplying the drive signal to the drive unit 45, the drive signal output unit 77 drives the lens unit 20 with the drive unit 45 in such a manner that the lens unit 20 is at the target position calculated by the target position calculation unit 72.

As described, by performing feedback control based on a result of the detection by the shake detection unit 61 or the barycentric position and the current position of the lens unit, the blur correction control unit 70 makes it possible to generate an image signal of an imaged image, an image blur of which is corrected, in the imaging unit 33.

Next, a servo arithmetic unit will be described. For example, the servo arithmetic unit 76 performs feedback processing by PID control in which proportional control (P control), integral control (I control unit), and differential control (D control) are selectively combined. In the PID control, the differential control (D control) is used to improve a decrease in a gain margin and a phase margin due to overcontrol by the proportional control (P control) and to improve stability of the feedback processing. The integral control (I control) is used to improve an offset property of the feedback processing. By selecting and combining the proportional control, the differential control, and the integral control as needed, the PID control is performed.

In the proportional control, a calculation of an equation (1) is performed and a control output is calculated.

$$\text{deviation} \times \text{proportional gain} = \text{proportional control output} \quad (1)$$

In the differential control a calculation of an equation (2) is performed and a control output is calculated.

$$(\text{deviation} - \text{deviation in previous calculation}) \times \text{differential gain} = \text{differential control output} \quad (2)$$

In the integral control, a calculation of an equation (3) is performed and a control output is calculated.

$$(\text{integrated value of deviation} + \text{deviation}) \times \text{integral gain} = \text{integral control output} \quad (3)$$

Figure 8:
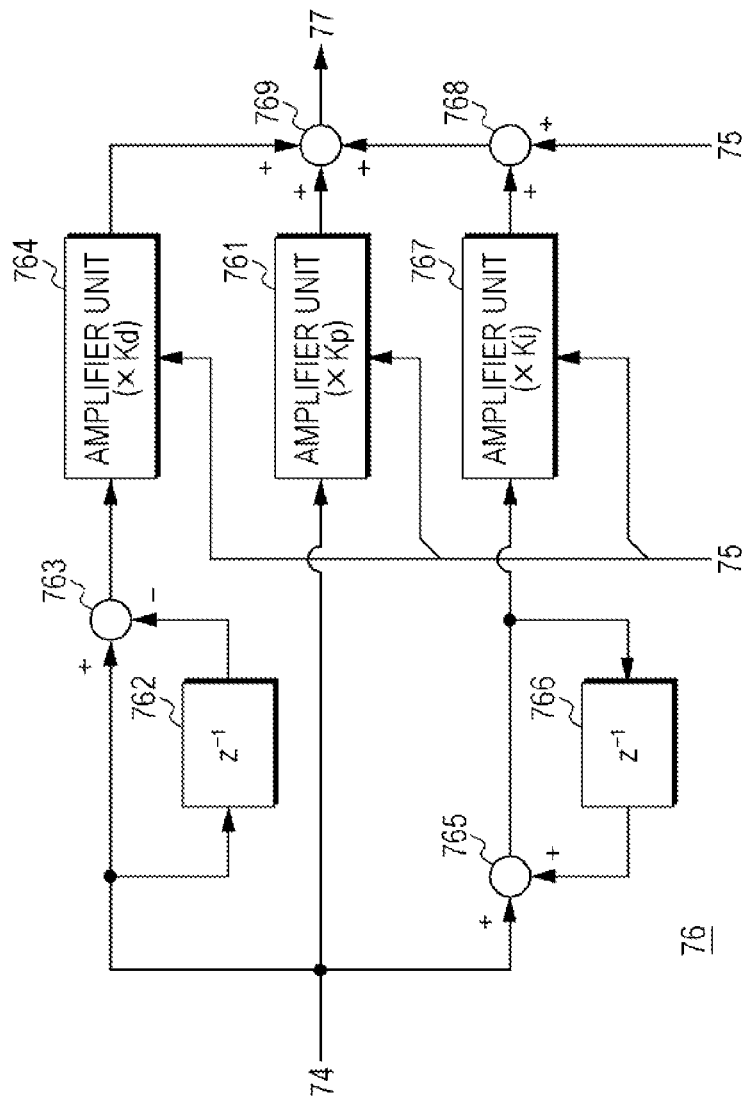
FIG. 8 is a view illustrating an example of a configuration of a servo arithmetic unit.

FIG. 8 is a view illustrating an example of a configuration of the servo arithmetic unit. The servo arithmetic unit 76 includes amplifier units 761, 764, and 767, delay units 762 and 766, and arithmetic units 763, 765, and 769.

The amplifier unit 761 multiplies the positional error signal supplied from the arithmetic unit 74 by a proportional gain Kp set by the parameter setting unit 75 and generates a proportional control signal which is a proportional control output. The amplifier unit 761 outputs the generated proportional control signal to the arithmetic unit 769.

The delay unit 762 delays the positional error signal supplied from the arithmetic unit 74 for one sampling period and outputs the delayed signal to the arithmetic unit 763.

The arithmetic unit 763 performs arithmetic processing to subtract the positional error signal, which is output from the delay unit 762, from the positional error signal supplied from the arithmetic unit 74 and generates a differential signal of the positional error. Then, the arithmetic unit 763 outputs the differential signal to the amplifier unit 764.

The amplifier unit 764 multiplies the differential signal supplied from the arithmetic unit 763 by a differential gain Kd set by the parameter setting unit 75 and generates a differential control signal which is a differential control output. The amplifier unit 764 outputs the generated differential control signal to the arithmetic unit 769.

The arithmetic unit 765 performs arithmetic processing to add a signal output from the delay unit 766 to the positional error signal supplied from the arithmetic unit 74 and generates an integral signal of the positional error. Then, the arithmetic unit 765 outputs the integral signal to the amplifier unit 767.

The delay unit 766 delays the integral signal supplied from the arithmetic unit 765 for one sampling period and outputs the delayed signal to the arithmetic unit 765.

The amplifier unit 767 multiplies the integral signal supplied from the arithmetic unit 765 by an integral gain Ki set by the parameter setting unit 75 and generates an integral control signal which is an integral control output. The amplifier unit 767 outputs the generated integral control signal to the arithmetic unit 768.

The arithmetic unit 768 adds a gravity compensation signal, which is supplied from the parameter setting unit 75, to the integral control signal supplied from the amplifier unit 767 and outputs the signal to the arithmetic unit 769. Note that the gravity compensation signal is a signal to cancel a load due to the gravity and a detail thereof will be described later.

The arithmetic unit 769 adds the proportional control signal supplied from the amplifier unit 761, the differential control signal supplied from the amplifier unit 764, and the integral control signal (to which gravity compensation signal is already added) supplied from the arithmetic unit 768 to each other and outputs a control signal after the adding to the drive signal output unit 77.

Note that in the generation of the integral control signal, after a signal corresponding to a load due to the gravity is added to the integral signal supplied to the amplifier unit 767, multiplying with the integral gain Ki may be performed by the amplifier unit 767 and a control signal equivalent to the integral control signal to which the gravity compensation signal is added may be generated. Also, a gain corresponding to a load due to the gravity (gravity compensation gain) may be added to the integral gain Ki and a control signal equivalent to the integral control signal to which the gravity compensation signal is added may be generated. Also, a control method is not limited to the PID control and a different control method may be used.

[2-2. Operation of First Embodiment]

Figure 9:
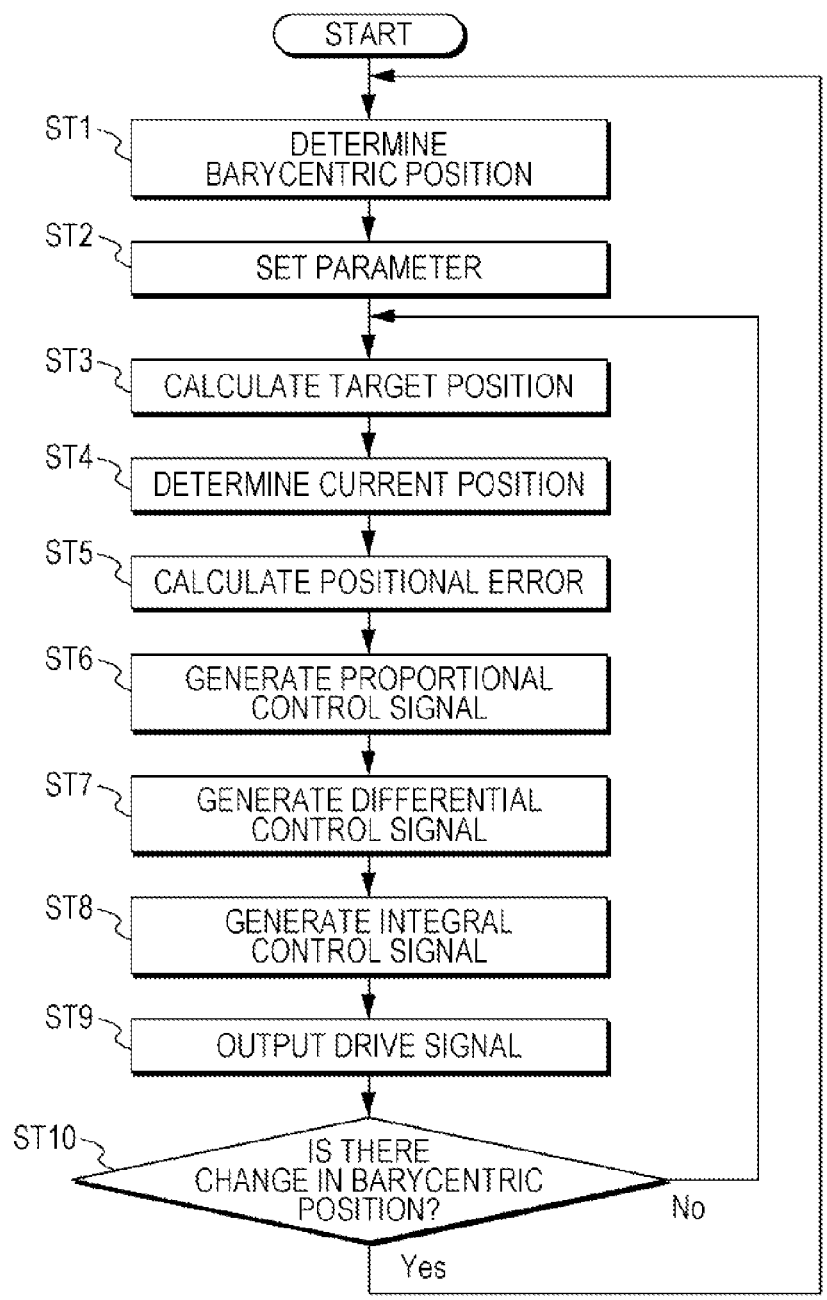
FIG. 9 is a flowchart illustrating an operation of the first embodiment.

FIG. 9 is a flowchart illustrating an operation of the first embodiment. In step ST1, the blur correction control unit 70 determines a barycentric position. The blur correction control unit 70 acquires a barycentric position of the lens unit 20 which position is calculated by the barycentric position calculation unit 62 and performs determination of the barycentric position. Then, the blur correction control unit 70 goes to step ST2.

In step ST2, the blur correction control unit 70 performs parameter setting. The blur correction control unit 70 sets a parameter based on a control signal from the control unit 85. Also, the blur correction control unit 70 changes the parameter according to the barycentric position of the lens unit 20 and goes to step ST3.

In step ST3, the blur correction control unit 70 calculates a target position. The blur correction control unit 70 calculates a shake amount of a shake applied to the imaging apparatus 10 (lens unit 20) based on a detection signal supplied from the shake detection unit 61. Based on the calculated shake amount, the blur correction control unit 70 calculates, as a target position, a position of the lens unit 20 at which position an image signal of an imaged image in which an image blur is not caused can be generated in the imaging unit 33, and goes to step ST4.

In step ST4, the blur correction control unit 70 determines a current position. The blur correction control unit 70 acquires a detection signal from the position detection unit 46, calculates a current position of the lens unit 20 based on the acquired detection signal, performs determination of the current position, and goes to step ST5.

In step ST5, the blur correction control unit 70 calculates a positional error. The blur correction control unit 70 calculates an error between the target position and the current position, generates a positional error signal indicating the calculated error, and goes to step ST6.

In step ST6, the blur correction control unit 70 generates a proportional control signal. The blur correction control unit 70 performs a calculation expressed by the above-described equation (1), generates a proportional control signal by multiplying the positional error signal by the proportional gain Kp, and goes to step ST7.

In step ST7, the blur correction control unit 70 generates a differential control signal. The blur correction control unit 70 performs a calculation expressed by the above-described equation (2), generates a differential control signal by generating a differential signal from the positional error signal and by multiplying the differential signal by the differential gain Kd, and goes to step ST8.

In step ST8, the blur correction control unit 70 generates an integral control signal. The blur correction control unit 70 performs a calculation expressed by the above-described equation (3) and generates an integral control signal by generating an integral signal from the positional error signal and by multiplying the integral signal by the integral gain Ki. Also, the blur correction control unit 70 adds a gravity compensation signal to the integral control signal and goes to step ST9.

In step ST9, the blur correction control unit 70 outputs a drive signal. The blur correction control unit 70 adds the proportional control signal, the differential control signal, and the integral control signal to each other and generates a drive signal based on the control signal after the adding. The blur correction control unit 70 outputs the generated drive signal to the drive unit 45 and goes to step ST10.

In step ST10, the blur correction control unit 70 determines whether there is a change in the barycentric position. The blur correction control unit 70 determines whether an movement operation of the focus lens or the zoom lens or an extension/contraction operation of the mirror tube is performed and a change in the barycentric position is caused. When determining that there is a change in the barycentric position, the blur correction control unit 70 goes back to step ST1 and when determining that there is no change in the barycentric position, the blur correction control unit 70 goes back to step ST3.

Note that either of the processing in step ST3 and the processing in step ST4 may be performed first. Also, an order of the processing from step ST6 to step ST8 is not limited to the order illustrated in the drawing.

Next, a parameter setting operation performed by the blur correction control unit 70 will be described. Based on a control signal from the control unit 85, the parameter setting unit 75 of the blur correction control unit 70 sets a proportional gain Kp, a differential gain Kd, and an integral gain Ki with which stable image blur correction can be performed, for example, in a case where a barycentric position is at a predetermined position. The parameter setting unit 75 supplies the set parameter to the servo arithmetic unit 76. Also, when the barycentric position calculated by the barycentric position calculation unit 62 is different from the predetermined position, such as in a case where the barycentric position is a position away from a support position where the lens unit 20 is supported rotatably, larger driving force becomes necessary to rotate the lens unit 20. That is, this case becomes similar to a case where inertia of the lens unit 20 is increased in the drive unit 45. In such a case, based on the barycentric position, the parameter setting unit 75 increases the proportional gain Kp as the inertia is increased, and increases driving force of the lens unit 20. Moreover, the parameter setting unit 75 adjusts the differential gain Kd or the integral gain Ki in such a manner that good image blur correction can be performed even when the proportional gain Kp is increased. For example, the differential gain Kd is adjusted in such a manner that a good response can be acquired and feedback processing can be performed in a stable manner without generation of oscillation even when the proportional gain Kp is increased. Also, the integral gain Ki is adjusted in such a manner that an offset property of the feedback processing becomes good and the lens unit 20 is securely at a target position even when the proportional gain Kp is increased.

Moreover, as the barycentric position becomes further away from the support position of the lens unit 20, a load (load in rotation direction) due to the gravity becomes large in the lens unit 20. Thus, in the servo operation, integral control is performed by using a correction value corresponding to the barycentric position of the lens unit. For example, as described above, an integral control signal to which a gravity compensation signal to cancel a load (load in rotation direction due to gravity) which changes according to the barycentric position of the lens unit is added is generated. Alternatively, a control signal equivalent to the integral control signal to which the gravity compensation signal is added is generated by multiplying an integral signal by the integral gain Ki after a signal corresponding to a load due to the gravity is added to the integral signal. Alternatively, a control signal equivalent to the integral control signal to which the gravity compensation signal is added is generated by adding, to the integral gain Ki, a gravity compensation gain corresponding to a load due to the gravity. When the integral control signal is generated in such a manner, an inclination of the lens unit 20 due to an influence of the gravity before the lens unit 20 reaches a target position can be prevented. Note that when the integrated value becomes stable, a servo operation is performed with weighting by the gravity being included. Thus, adding of the gravity compensation signal or the gravity compensation gain only needs to be performed in a predetermined period from the beginning of the control until the integrated value becomes stable.

In such a manner, according to the first embodiment, when a shake range in which shake correction can be performed is broadened by rotating the lens unit in the yawing direction and in the pitching direction, in the blur correction control unit 70, a parameter of the servo operation is changed according to a movement of the barycentric position of the lens unit 20 caused due to performance of a movement operation of the focus lens or the zoom lens, an extension/contraction operation of the mirror tube, or the like. Thus, for example, even when the barycentric position of the lens unit varies due to the performance of a focus adjusting operation or a zooming operation by the imaging apparatus, it becomes possible to perform optimal image blur correction and to improve performance in image blur correction. Also, since the parameter of the servo operation is changed according to a movement of the barycentric position, driving force to rotate the lens unit 20 does not become large. Thus, power consumption can be prevented from becoming large and image blur correction can be performed efficiently.

<3. Second Embodiment>

Incidentally, variation in the barycentric position of the lens unit is not limited to the focus adjusting operation or the zooming operation. For example, in a case where an accessory such as a conversion lens is mounted to a tip of the lens unit, a barycenter of the lens unit moves to the front. Also, since the accessory is mounted, weight of the lens unit is increased. Thus, in the second embodiment, a case where a control operation in image blur correction is switched according to a mounting state of an accessory will be described.

[3-1. Configuration and Operation of Second]Embodiment

Figure 10:
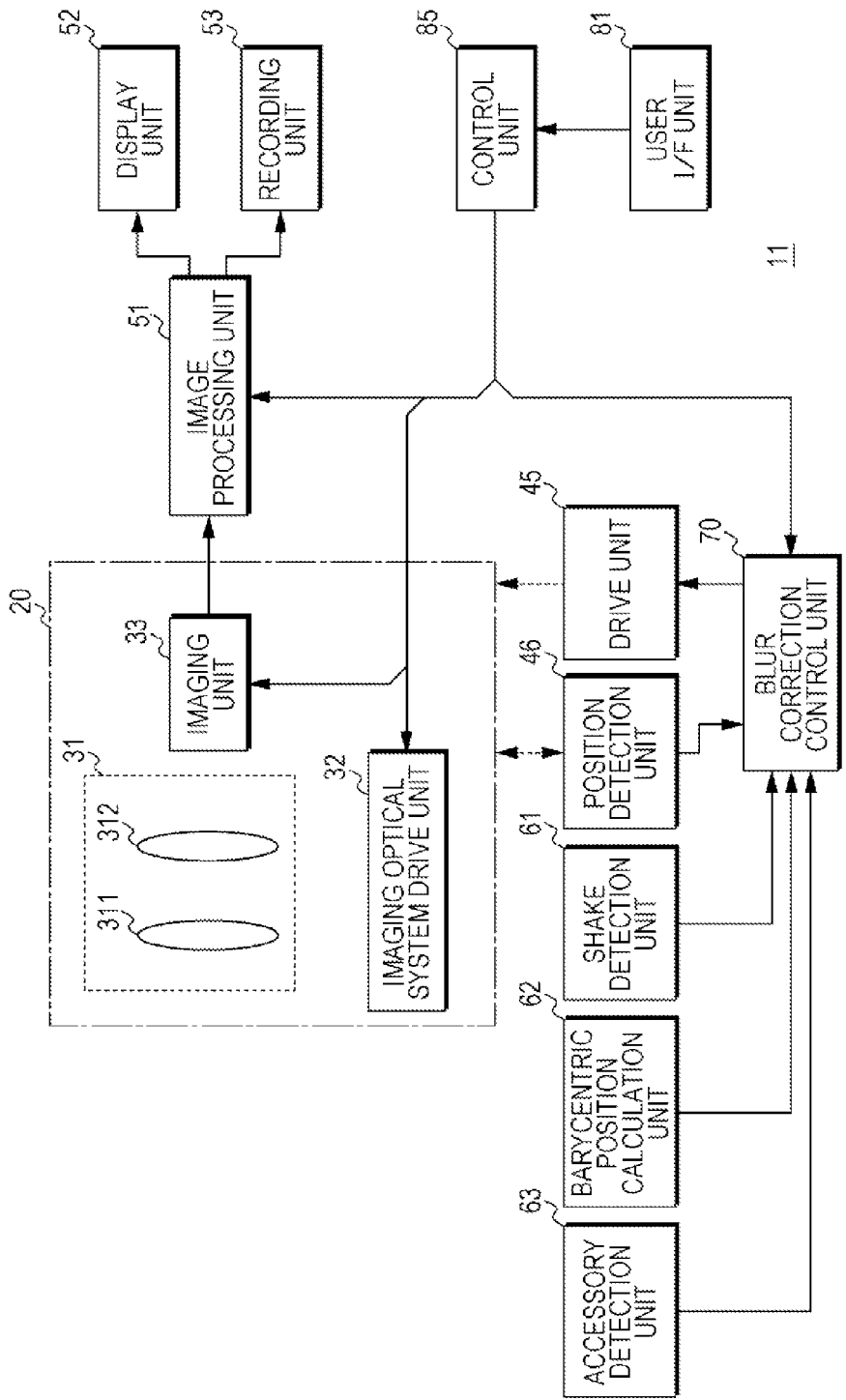
FIG. 10 is a view illustrating an example of a configuration of a second embodiment.

FIG. 10 is a view illustrating an example of a configuration of the second embodiment. An imaging apparatus 11 using an image blur correction apparatus includes a lens unit 20, a drive unit 45, a position detection unit 46, an image processing unit 51, a display unit 52, a recording unit 53, a shake detection unit 61, an barycentric position calculation unit 62, an accessory detection unit 63, a blur correction control unit 70, an user interface (user I/F) unit 81, and a control unit 85.

To the lens unit 20, an imaging optical system 31, an imaging optical system drive unit 32, and an imaging unit 33 are provided.

The imaging optical system 31 includes a focus lens 311, a zoom lens 312, or the like. In the imaging optical system 31, for example, the focus lens 311 is moved in an optical axis direction and a focus adjustment is performed. Also, the zoom lens 312 is moved in the optical axis direction and a focal length is varied.

The imaging optical system drive unit 32 drives the focus lens 311 or the zoom lens 312 based on a control signal from the control unit 85 which will be described later.

The imaging unit 33 includes an imaging element, a preprocessing unit, an imaging drive unit, and the like. The imaging element performs photoelectric conversion processing and converts an optical image, which is formed on an imaging surface by the imaging optical system 31, into an electric signal. As the imaging element, for example, a charge coupled device (CCD) image sensor or a complementary metal-oxide semiconductor (CMOS) image sensor is used. The preprocessing unit performs noise elimination processing such as correlated double sampling (CDS) on the electric signal generated in the imaging element. Also, the preprocessing unit performs a gain adjustment to make a signal level of the electric signal into an intended signal level. Furthermore, the preprocessing unit performs A/D conversion processing and converts an analog image signal, which is the electric signal on which the noise elimination processing or the gain adjustment is performed, into a digital image signal. Then, the preprocessing unit outputs the digital image signal to an image processing unit 51. The imaging drive unit generates an operation pulse or the like necessary for driving the imaging element based on a control signal from the control unit 85 which will be described later. For example, an electric charge reading pulse to read electric charge, a transfer pulse to perform transfer in the vertical direction or the horizontal direction, and a shutter pulse to perform an electronic shutter operation are generated.

As described above, the drive unit 45 rotates the lens unit 20 in the yawing direction and in the pitching direction based on a drive signal supplied from the blur correction control unit 70. Also, the position detection unit 46 generates a detection signal corresponding to a position of the lens unit 20 and outputs the detection signal to the blur correction control unit 70. For example, detection signals respectively generated in the hall elements 46ya (46yb) and 46pa (46pb) are output to the blur correction control unit 70.

The image processing unit 51 performs camera process processing or the like on the digital image signal output from the imaging unit 33. For example, on the image signal, the image processing unit 51 performs nonlinear processing, color correction processing, contour emphasizing processing, or the like such as gamma correction or knee correction. The image processing unit 51 outputs the processed image signal to the display unit 52 or the recording unit 53.

The display unit 52 configures a display panel or an electronic viewfinder and performs, for example, display of a live view image based on the image signal output from the image processing unit 51. Also, the display unit 52 performs menu display, operation state display, or the like to perform operation setting of the imaging apparatus 11. Note that when the number of display pixels is less than the number of pixels of the imaged image, the display unit 52 performs processing to convert the imaged image into a display image of the number of display images.

The recording unit 53 records the image signal output from the image processing unit 51 into a recording medium. The recording medium may be a removable medium such as a memory card, an optical disk, or a magnetic tape or may be a fixed-type hard disk drive (HDD), semiconductor memory module, or the like. Also, an encoder or a decoder may be provided to the recording unit 53 and compression coding or extension decoding of the image signal may be performed. To the recording medium, a coded signal may be recorded. Note that in the recording unit 53, an image signal or a coded signal recorded in the recording medium may be read and a recorded image may be displayed on the display unit 52.

The shake detection unit 61 includes a sensor to detect a shake applied to the imaging apparatus 11 (lens unit 20) such as an acceleration sensor or a gyro sensor. The shake detection unit 61 detects a shake applied to the imaging apparatus 11 (lens unit 20) and outputs a result of the detection to the blur correction control unit 70.

The barycentric position calculation unit 62 calculates a barycenter of the lens unit 20 which changes according to a position of the focus lens 311 or the zoom lens 312 of the imaging optical system 31 and an extension state of the mirror tube 21. For example, a barycentric position is previously calculated for each position of the focus lens 311 or the zoom lens 312 and each extension state of the mirror tube 21 and is stored into the barycentric position calculation unit 62. The barycentric position calculation unit 62 calculates the barycenter of the lens unit 20 by acquiring, from the lens unit 20, information indicating a position of the focus lens 311 or the zoom lens 312 and an extension state of the mirror tube 21 and by selecting a barycentric position corresponding to the acquired information. Also, the barycentric position calculation unit 62 may calculate the barycenter of the lens unit 20 by using a control signal supplied from the control unit 85 to the imaging optical system drive unit 32. For example, the barycentric position calculation unit 62 determines a position of the focus lens 311 or the zoom lens 312 and an extension state of the mirror tube 21 based on the control signal supplied to the imaging optical system drive unit 32 and calculates a barycentric position of the lens unit 20 based on a result of the determination. The barycentric position calculation unit 62 outputs the barycentric position of the lens unit 20 to the blur correction control unit 70.

The accessory detection unit 63 detects whether an accessory is mounted to the lens unit 20. Also, in a case where a plurality of kinds of accessories can be mounted, a kind of the mounted accessory is detected. For example, the accessory detection unit 63 automatically detects whether an accessory such as a conversion lens is mounted to the tip of the lens unit 20. The mounting of an accessory may be detected by using an optical detection unit such as a switch or a photoreflector and information related to the accessory may be acquired by performing communication with the accessory during the detection of the mounting of the accessory. The accessory is, for example, a conversion lens such as a teleconverter or a wide converter, a filter, or a hood which is mounted to the lens unit. The accessory detection unit 63 outputs a result of the detection to the blur correction control unit 70.

The blur correction control unit 70 generates a drive signal based on the shake detected by the shake detection unit 61 and the position of the lens unit 20 detected by the position detection unit 46. The blur correction control unit 70 supplies the generated drive signal to the drive unit 45 and makes it possible to generate an image signal of an imaged image, an image blur of which is corrected, in the imaging unit 33. Also, the blur correction control unit 70 controls generation of a drive signal based on the barycentric position calculated by the barycentric position calculation unit 62 and makes it possible to constantly generate the image signal of the imaged image, an image blur of which is corrected, in the imaging unit 33 even when the barycentric position of the lens unit 20 varies. Furthermore, based on a result of the detection by the accessory detection unit 63, the blur correction control unit 70 controls the generation of the drive signal and makes it possible to constantly generate an image signal of an imaged image, an image blur of which is corrected, in the imaging unit 33 even when the barycentric position of the lens unit 20 varies or even when weight thereof is increased.

The user I/F unit 81 includes a zoom lever, a shooting button, and the like. The user I/F unit 81 generates an operation signal corresponding to user operation and outputs the operation signal to the control unit 85.

The control unit 85 includes, for example, a central processing unit (CPU), a read only memory (ROM), and a random access memory (RAM). The CPU reads and executes a program housed in the ROM when necessary. In the ROM, the program executed in the CPU, data which becomes necessary in various kinds of processing, and the like are stored in advance. The RAM is a memory which is used as a so-called work area which temporarily stores a halfway result of processing. Also, the ROM or the RAM stores various kinds of control information, correction data, and the like. The control unit 85 performs control of each unit according to an operation signal or the like from the user I/F unit 81 and makes the imaging apparatus 11 perform an operation corresponding to user operation. Also, the control unit 85 controls the blur correction control unit 70 and makes the blur correction control unit 70 perform an image blur correction operation.

Figure 11:
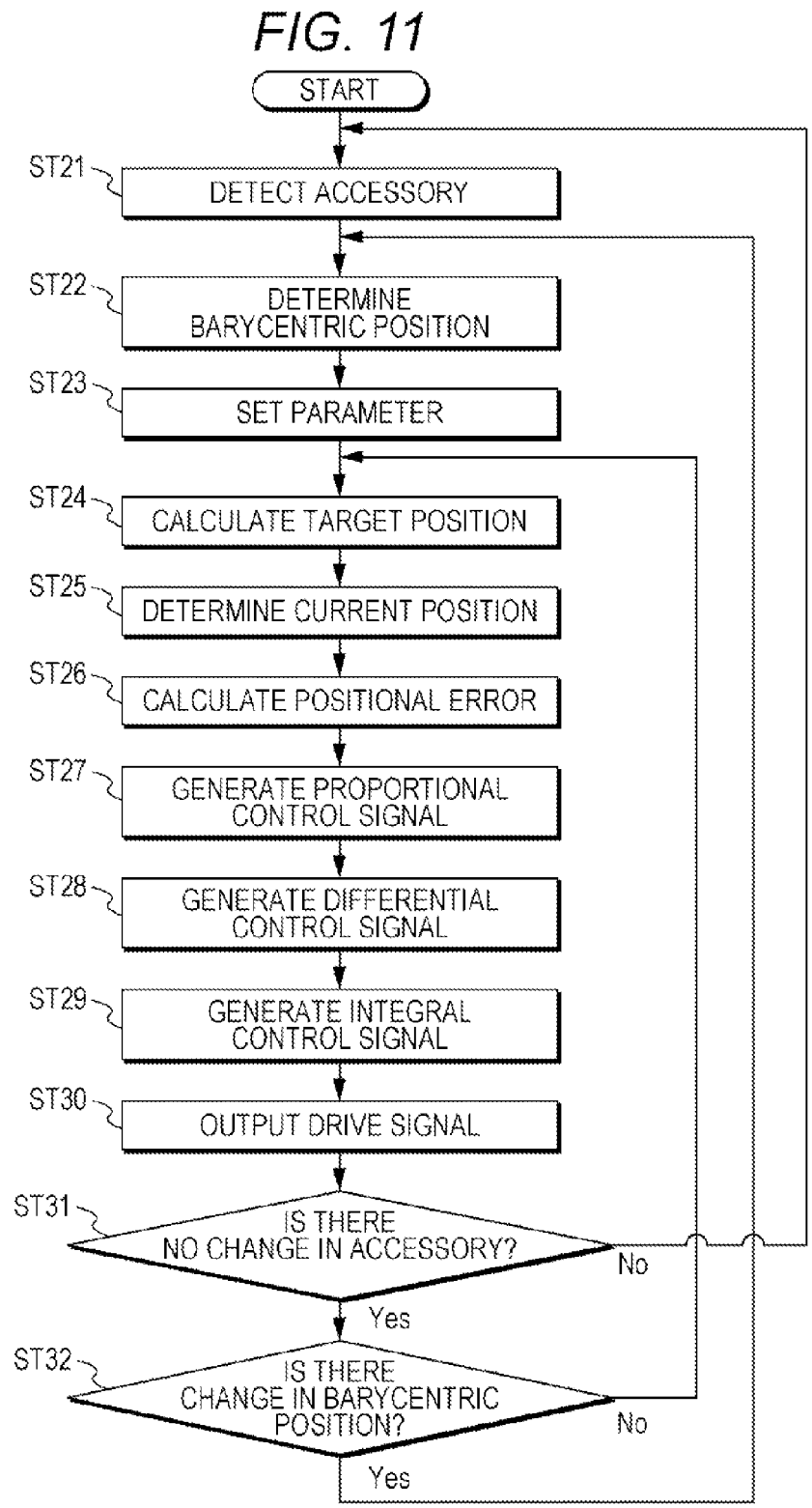
FIG. 11 is a flowchart illustrating an operation of the second embodiment.

FIG. 11 is a flowchart illustrating an operation of the second embodiment. In step ST21, the blur correction control unit 70 detects an accessory. Based on a result of the detection by the accessory detection unit 63, the blur correction control unit 70 detects what kind of accessory is mounted to the lens unit 20 and goes to step ST22.

In step ST22, the blur correction control unit 70 determines a barycentric position. The blur correction control unit 70 acquires a barycentric position of the lens unit 20 which position is calculated by the barycentric position calculation unit 62, performs determination of the barycentric position, and goes to step ST23.

In step ST23, the blur correction control unit 70 performs parameter setting. The blur correction control unit 70 sets a parameter based on a control signal from the control unit 85. Also, the blur correction control unit 70 changes a parameter according to the barycentric position of the lens unit 20 and goes to step ST24.

In step ST24, the blur correction control unit 70 calculates a target position. The blur correction control unit 70 calculates a shake amount of the shake applied to the imaging apparatus 11 (lens unit 20) based on a detection signal supplied from the shake detection unit 61. Based on the calculated shake amount, the blur correction control unit 70 calculates, as a target position, a position of the lens unit 20 at which position an image signal of an imaged image in which an image blur is not caused can be generated in the imaging unit 33, and goes to step ST25.

In step ST25, the blur correction control unit 70 determines a current position. The blur correction control unit 70 acquires a detection signal from the position detection unit 46, calculates a current position of the lens unit 20 based on the acquired detection signal, performs determination of the current position, and goes to step ST26.

In step ST26, the blur correction control unit 70 calculates a positional error. The blur correction control unit 70 calculates an error between the target position and the current position, generates a positional error signal indicating the calculated error, and goes to step ST27.

In step ST27, the blur correction control unit 70 generates a proportional control signal. The blur correction control unit 70 performs a calculation expressed by the above-described equation (1), generates a proportional control signal by multiplying the positional error signal by a proportional gain Kp, and goes to step ST28.

In step ST28, the blur correction control unit 70 generates a differential control signal. The blur correction control unit 70 performs a calculation expressed by the above-described equation (2), generates a differential control signal by generating a differential signal from the positional error signal and by multiplying the differential signal by a differential gain Kd, and goes to step ST29.

In step ST29, the blur correction control unit 70 generates an integral control signal. The blur correction control unit 70 performs a calculation expressed by the above-described equation (3) and generates an integral control signal by generating an integral signal from the positional error signal and by multiplying the integral signal by an integral gain Ki. Also, the blur correction control unit 70 adds a gravity compensation signal to the integral control signal and goes to step ST30.

In step ST30, the blur correction control unit 70 outputs a drive signal. The blur correction control unit 70 adds the proportional control signal, the differential control signal, and the integral control signal to each other and generates a drive signal based on the control signal after the adding. The blur correction control unit 70 outputs the generated drive signal to the drive unit 45 and goes to step ST31.

In step ST31, the blur correction control unit 70 detects whether the accessory is changed. Based on a result of the detection by the accessory detection unit 63, the blur correction control unit 70 determines whether a change of the accessory, that is, a change in attachment/detachment state of the accessory or a change into a different accessory is performed. When there is no change in the accessory, the blur correction control unit 70 goes to step ST32 and when there is a change in the accessory, the blur correction control unit 70 goes back to step ST21.

In step ST32, the blur correction control unit 70 determines whether there is a change in the barycentric position. The blur correction control unit 70 determines whether an movement operation of the focus lens or the zoom lens or an extension/contraction operation of the mirror tube is performed and a change in the barycentric position is caused. When determining that there is a change in the barycentric position, the blur correction control unit 70 goes back to step ST22 and when determining that there is no change in the barycentric position, the blur correction control unit 70 goes back to step ST24.

Note that either of the processing in step ST24 and the processing in step ST25 can be performed first. Also, an order of the processing from step ST27 to step ST29 is not limited to the order illustrated in the drawing.

In such a manner, according to the second embodiment, when a shake range in which shake correction can be performed is broadened by rotating the lens unit in the yawing direction and in the pitching direction, in the blur correction control unit 70, a parameter of the servo operation is changed according to a movement of the barycentric position of the lens unit 20 caused due to performance of a movement operation of the focus lens or the zoom lens, an extension/contraction operation of the mirror tube, or the like. Moreover, a parameter of the servo operation is changed according to an attachment/detachment state of an accessory or according to a mounted accessory. Thus, even when a barycentric position of the lens unit varies due to the performance of a focus adjusting operation or a zooming operation by the imaging apparatus and even when an accessory is used, it becomes possible to perform optimal image blur correction and to improve performance in image blur correction. Also, since a parameter of the servo operation is changed according to a movement of the barycentric position, driving force to rotate the lens unit 20 does not become large. Thus, power consumption can be prevented from becoming large. Also, even when weight of the lens unit is increased due to mounting of an accessory, driving force to rotate the lens unit 20 does not become insufficient and image blur correction can be performed efficiently.

Also, a series of processing described in the description can be executed by hardware, software, or a composite configuration of the two. When the processing is executed by software, a program in which a processing sequence is recorded is installed into a memory in a computer embedded into special hardware and is executed. Also, it is possible to install the program into a general computer which can execute various kinds of processing and to execute the program.

For example, the program can be previously recorded into a hard disk or a read only memory (ROM) which functions as a recording medium. Alternatively, the program may be temporarily or permanently housed (recorded) in a removable recording medium such as a flexible disk, a compact disc read only memory (CD-ROM), a magneto optical (MO) disk, a digital versatile disc (DVD), a magnetic disk, or a semiconductor memory card. Such a removable recording medium can be provided as a so-called package software.

Also, other than being installed from the removable recording medium to a computer, the program may be transferred from a download site to a computer in a wireless or wired manner through a network such as a local area network (LAN) or the Internet. In the computer, the program transferred in such a manner can be received and installed into a built-in recording medium such as a hard disk.

Also, the present technique is not limited to the above described embodiments of the technique. Each of the embodiments of the present technique discloses the present technique as an example. It is obvious that modification or substitution of the embodiments can be performed by those skilled in the art within the spirit and the scope of the present technique. That is, to determine the spirit of the present technique, the claims should be considered. Note that an image blur correction apparatus of the present technique can also include the following configurations.

(1) An image blur correction apparatus including:
a lens unit which includes an imaging optical system and an imaging unit configured to generate an image signal of an imaged image and which is supported rotatably in a yawing direction and in a pitching direction; a shake detection unit configured to detect a shake applied to the lens unit; a position detection unit configured to detect a position of the lens unit; a drive unit configured to perform rotation driving of the lens unit in the yawing direction and in the pitching direction; and a blur correction control unit configured to correct an image blur of the imaged image by controlling the driving operation, which is performed by the drive unit, based on the shake detected by the shake detection unit, the position detected by the position detection unit, and a barycentric position of the lens unit.

(2) The image blur correction apparatus according to (1), wherein according to a deviation between a target position of the lens unit which position is calculated based on the shake detected by the shake detection unit and the position of the lens unit which position is detected by the position detection unit and according to the barycentric position of the lens unit, the blur correction control unit performs a combination of proportional control, differential control, and integral control and controls the driving operation in such a manner that the position of the lens unit becomes identical to the target position.

(3) The image blur correction apparatus according to (2), wherein in the integral control, the integral control is performed by using a correction value corresponding to the barycentric position of the lens unit.

(4) The image blur correction apparatus according to (3), wherein the correction value is set in such a manner to cancel a load which changes depending on the barycentric position of the lens unit.

(5) The image blur correction apparatus according to any of (1) to (4), further including a barycentric position calculation unit configured to calculate the barycentric position of the lens unit, wherein the barycentric position calculation unit calculates the barycentric position based on a lens position of the lens unit and an extension state of a mirror tube of the lens unit.

(6) The image blur correction apparatus according to any of (1) to (5), further including an accessory detection unit configured to detect mounting of an accessory to the lens unit, wherein the blur correction control unit controls the driving operation, which is performed by the drive unit, by using a result of the detection by the accessory detection unit.

INDUSTRIAL APPLICABILITY

In an image blur correction apparatus, a method of correcting an image blur, and an imaging apparatus of the present technique, a lens unit including an imaging optical system and an imaging unit configured to generate an image signal of an imaged image is supported rotatably in a yawing direction and in a pitching direction. Based on a shake applied to the lens unit, a position of the lens unit, and a barycentric position of the lens unit, a driving operation by a drive unit to perform rotation driving of the lens unit in the yawing direction and in the pitching direction is controlled and correction of an image blur of the imaged image is performed. Thus, even when a barycentric position of the lens unit varies due to a focus adjusting operation, a zooming operation, or the like, it becomes possible to perform optimal image blur correction and to improve performance in image blur correction.

Thus, for example, the present technique is suitable for an electronic device in which a length of a lens mirror tube changes due to a focus adjusting operation, a zooming operation, or the like.

REFERENCE SIGNS LIST 10, 11 imaging apparatus
20 lens unit
21 mirror tube
22 rolling surface
25pa, 25pb, 25ya, 25yb magnet
31 imaging optical system
32 imaging optical system drive unit
33 imaging unit
41 chassis
42 unit holding part
43 ball holding part
44 ball
45 drive unit
45pa, 45pb, 45ya, 45yb drive coil
46 position detection unit
46pa, 46pb, 46ya, 46yb hall element
51 image processing unit
52 display unit
53 recording unit
61 shake detection unit
62 barycentric position calculation unit
63 accessory detection unit
70 blur correction control unit
71 shake amount calculation unit
72 target position calculation unit
73 current position calculation unit
74, 763, 765, 768, 769 arithmetic unit
75 parameter setting unit
76 servo arithmetic unit
77 drive signal output unit
81 user interface (user I/F) unit
85 control unit
311 focus lens
312 zoom lens
411 surface of a chassis
761, 764, 767 amplifier unit
762, 766 delay unit

The invention claimed is:

1. An image blur correction apparatus comprising:
a lens unit which includes an imaging optical system and an imaging unit configured to generate an image signal of an imaged image and which is supported rotatably in a yawing direction and in a pitching direction;
a shake detection unit configured to detect a shake applied to the lens unit;
a position detection unit configured to detect a position of the lens unit;
a drive unit configured to perform rotation driving of the lens unit in the yawing direction and in the pitching direction; and
a blur correction control unit configured to correct an image blur of the imaged image by controlling the driving operation, which is performed by the drive unit, based on the shake detected by the shake detection unit, the position detected by the position detection unit, and a barycentric position of the lens unit.

2. The image blur correction apparatus according to claim 1, wherein according to a deviation between a target position of the lens unit which position is calculated based on the shake detected by the shake detection unit and the position of the lens unit which position is detected by the position detection unit and according to the barycentric position of the lens unit, the blur correction control unit performs a combination of proportional control, differential control, and integral control and controls the driving operation in such a manner that the position of the lens unit becomes identical to the target position.

3. The image blur correction apparatus according to claim 2, wherein in the integral control, the integral control is performed by using a correction value corresponding to the barycentric position of the lens unit.

4. The image blur correction apparatus according to claim 3, wherein the correction value is set in such a manner to cancel a load which changes depending on the barycentric position of the lens unit.

5. The image blur correction apparatus according to claim 1, further comprising a barycentric position calculation unit configured to calculate the barycentric position of the lens unit,
wherein the barycentric position calculation unit calculates the barycentric position based on a lens position of the lens unit and an extension state of a mirror tube of the lens unit.

6. The image blur correction apparatus according to claim 1, further comprising an accessory detection unit configured to detect mounting of an accessory to the lens unit,
wherein the blur correction control unit controls the driving operation, which is performed by the drive unit, by using a result of the detection by the accessory detection unit.

7. A method of correcting an image blur, comprising:
detecting a shake applied to a lens unit which includes an imaging optical system and an imaging unit configured to generate an image signal of an imaged image and which is supported rotatably in a yawing direction and in a pitching direction;
detecting a position of the lens unit;
performing rotation driving of the lens unit in the yawing direction and in the pitching direction; and
correcting an image blur of the imaged image by controlling a rotation driving operation of the lens unit based on the detected shake, the detected position, and a barycentric position of the lens unit.

8. An imaging apparatus comprising:
a lens unit which includes an imaging optical system and an imaging unit configured to generate an image signal of an imaged image and which is supported rotatably in a yawing direction and in a pitching direction;
a shake detection unit configured to detect a shake applied to the lens unit;
a position detection unit configured to detect a position of the lens unit;
a drive unit configured to perform rotation driving of the lens unit in the yawing direction and in the pitching direction;
a blur correction control unit configured to correct an image blur of the imaged image by controlling the driving operation, which is performed by the drive unit, based on the shake detected by the shake detection unit, the position detected by the position detection unit, and a barycentric position of the lens unit; and
a control unit configured to control an operation of the blur correction control unit.

* * * * *